July 19, 1966 D. E. BLASER 3,261,775
FLUID COKING PROCESS
Filed April 23, 1963
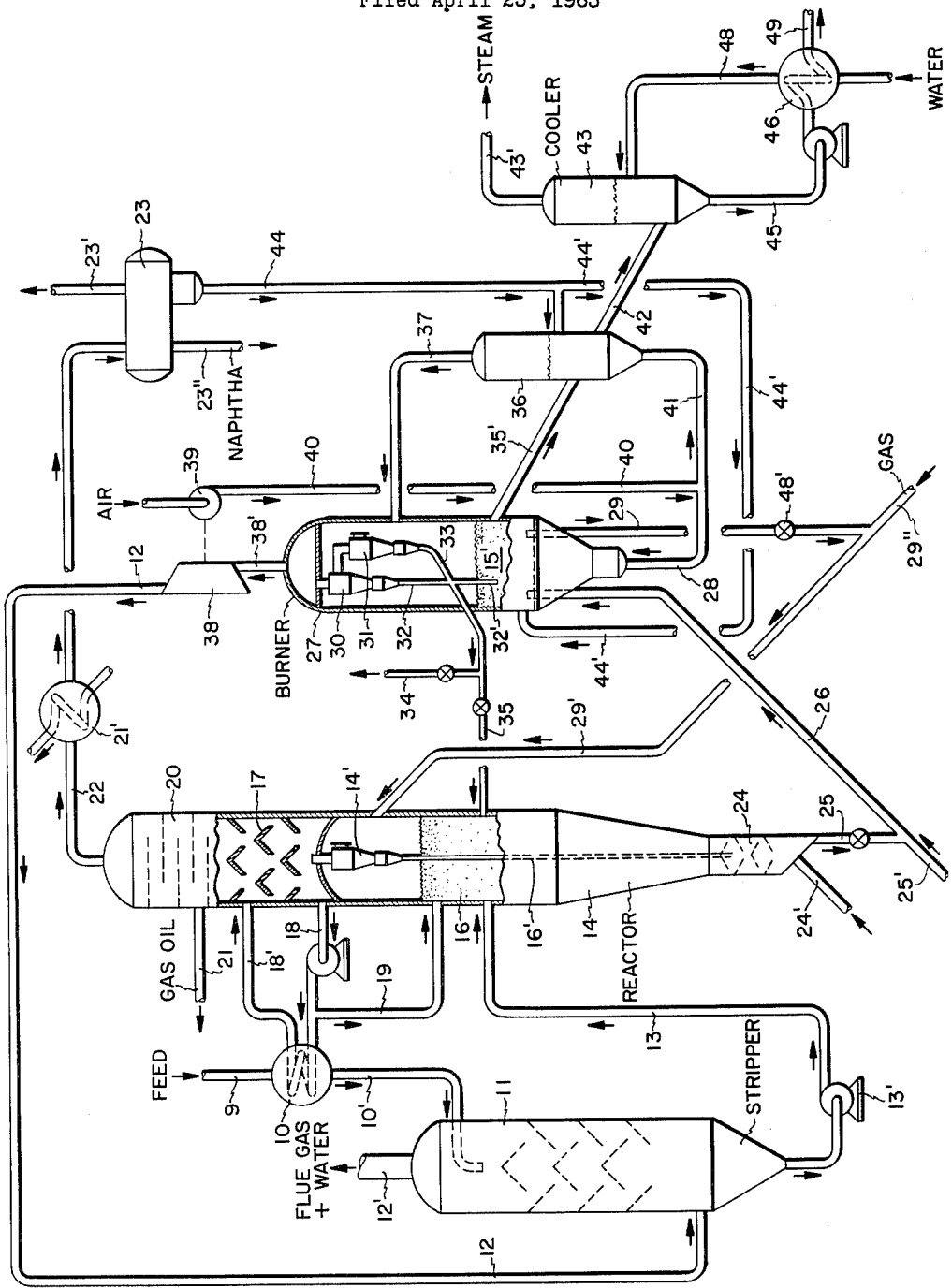
DON E. BLASER Inventor
By George J Anthony
Patent Attorney

United States Patent Office 3,261,775
Patented July 19, 1966

3,261,775
FLUID COKING PROCESS
Don E. Blaser, Dover, N.J., assignor to Esso Research and Engineering Company, a corporation of Delaware
Filed Apr. 23, 1963, Ser. No. 274,964
9 Claims. (Cl. 208—85)

This invention relates to an improved process for the recovery of oil from bituminous sands containing a mixture of water, bitumen and mineral solids such as clay and sand. More particularly, the invention relates to the recovery of oil from tar sands.

A huge deposit of tar sands exists in Alberta in a region known as the Athabaska district of Canada. Great difficulty has been encountered in separating the crude oil found in these tar sands from the other products there admixed. The extracted oil from the sand, also referred to as froth, normally contains about 30–45 weight percent of $H_2O$, 6–12 weight percent of solids and the balance of approximately 40–60 weight percent bitumen. The extracted oil contains between 10 and 50 vol. percent of air. This composition has led to a variety of problems. Any separation technique must be so designed that the heating of the froth mixture does not result in foaming. Additional difficulties have been caused by the ever-present problem of erosion. The great amount of sand present will tend to erode any solid construction materials with which they come into contact. This problem is particularly acute when high speeds are involved so that in separating the oil from the mixture it is desirable to coat the solids.

Since there is a large amount of fine material in this sand, there is an ever-present problem of entrainment within any separation equipment.

A variety of processes have been suggested to separate the oil from the froth mixture. As a rule they have been plagued by the above-mentioned difficulties. Any previous method which has avoided these problems has been prohibitively expensive and, therefore, widespread acceptance has been negated.

It is the object of this invention to provide a method for the separation of crude oil from a feed such as tar sands or the like which contain bitumen, mineral solids and water which minimizes or eliminates the previously enumerated problems of expense, erosion and entrainment. It should be noted that extraction methods which produce this feed often add as much as 50 vol. percent air to the mixture.

According to a preferred embodiment of this invention, a feed extracted from tar sands or the like and containing bitumen, solids and water is preheated and then is introduced into the top of a tower. The feed is then contacted countercurrently with flue gas and much of the water is stripped out of the feed. The resulting mixture is then passed to a conventional fluid coker which consists of a reactor and burner; within the burner may be two or three stages of cyclone separators. The remaining water is vaporized out of the feed and much of the coke formed during the coking step is burned off the sand within the burner; the remaining coke serves to coat the solids. The diplegs of the cyclones within the burner empty into the burner itself or outside the burner. All or part of the fines may be rejected; rejected fines are disposed of by conventional means. The reactor cyclone diplegs discharge to the reactor stripper. In this manner most of the fine materials are carried to the burner.

Since fluid coking requires a fairly constant particle size, the efficiency of a fluid coker designed to process these bitumens would be greatly enhanced by providing these methods for separation of fine material.

The solids and the remaining coke are transported to a second, high temperature burner where all the coke is burned and the sand is heated. The "hot" sand is now transferred to a steam-water drum. Contacting of the hot sand and water releases about 15–45 p.s.i.g. of steam; this large amount of energy is recovered and may be used for any desired purpose. The sand is then removed in the form of a sand-water slurry.

The flue gas from the second, high temperature burner is passed to the first stage burner thereby combining the flue gases. The combined gases are then passed through one or more stages of cyclones where dust and fine coke is recovered. The flue gas may then be channeled through a waste gas turbine, driving an air blower which supplies air for both the first and second burner. From the turbine the hot flue gas passes to the lower portion of the tower where it serves to impart some heat to the feed and also strip out most of the water.

Water is injected into the second stage burner to absorb the heat of combustion of the coke by forming steam and also provide additional heat carrier in the flue gas for stripping. Water may also be added to the first stage burner for the same reason.

The attached drawing sets forth diagrammatically an apparatus with which a preferred embodiment of the present invention may be carried into effect.

In the drawing, the reference numeral 9 indicates a line through which feed containing bitumen admixed with clay, water, air and sand is introduced into heater or heat exchanger 10. The feed is an extract of tar sand or bituminous sand and contains about 30–45% $H_2O$, 6–12% of solids and the balance of approximately 40–60% bitumen. The extracted oil contains between 10–50 vol. percent of air. The feed is preheated to a temperature of 100 to 250° F. and is then introduced into the upper portion of tower 11 by means of line 10'. Tower 11 may be any one of a variety of towers and is shown as a shed tower. Burner or flue gases at a temperature of 1000 to 1200° F. are introduced into the bottom region of shed tower 11 through line 12. The feed and heated gas are contacted countercurrently and the gas serves to evaporate and remove most of the water which is found within the bitumen-containing feed. Temperature within the tower is about 200 to 250° F. The bitumen, sand, clay and remaining water are removed from the bottom of tower 11 through line 13. Flue gas and steam pass overhead through valved outlet line 12' from tower 11. This mixture in line 13 is passed through pump 13' and then is introduced into the reactor 14 of a fluid coker unit. The coker unit consists of reactor 14 and burner 27.

Reactor 14 is maintained at a temperature between 800–1200° F. and preferably at about 950° F. Pressure may be maintained between 0–30 p.s.i.g and preferably at about 10–15 p.s.i.g. Superficial gas velocity in reactor 14 may be between 0.5 and 4 feet per second and the fluid bed depth should be kept at 30 to 70 feet. Coke particle size may vary between 60 and 1000 microns, mostly between 20 and 300 microns. The fluidized bed 16 is maintained as such by the upflowing hydrocarbon gases and vapors formed by the coking of the bitumen in the feed and by steam added to the stripping section 24 in reactor 14 through line 24'. The steam acts to strip out volatile hydrocarbons from the solid particles therein.

When using finely divided coke of about 20 and 300 microns and at a superficial gas velocity as above mentioned the density of the fluidized bed 16 will be about 40 pounds per cubic foot, but may vary between about 15 and 60 pounds per cubic foot, depending on the gas velocity selected and the particular particle size range.

The bitumen is distributed on the solid mineral particles, including sand, and is cracked and vaporizes and coke is deposited on the solid particles in the bed 16. Vapor products leave the bed 16 and pass through one or more cyclone separators 14' at which time most of the entrained coke is removed and returned to stripper 24 through dipleg 16'. Vapors from reactor 14 pass up through scrubber 17 at which time remaining coke dust and clay are scrubbed out and products are cooled and heavy ends condensed to form a slurry. The slurry is removed through line 18 and a portion recycled back to bed 16 through line 19. Another portion of the slurry is passed through heat exchanger 10 via line 18' and returned as cooled liquid to scrubber 17 as reflux.

The vapor continues on upward to fractionator 20 and is fractionated. Gas oil is removed through line 21; overhead products are removed through line 22 and directed to separator 23 after passing through condenser 21'; naphtha is removed from separator 23 through line 23". Water is removed from the bottom of separator 23 and passed to the burner 36 through line 44; $C_6$— gaseous hydrocarbons are removed through line 23'. Any remaining water in the bitumen feed is vaporized within the reactor 14. The water in the separator is recovered from the steam and tar sands. It is at a temperature of 70° F. to 230° F. when removed from separator 23.

Coke is deposited on the sand and clay particles and upon coke particles in the reactor 14 during the coking step in reactor 14. The coke-containing particles pass down the reactor 14 into stripping zone 24. After this the particles flow down standpipe 25, are admixed with steam introduced through line 25' and then flow up through riser 26 into the fluid bed burner 27.

The burner 27 may be maintained at a temperature between 800 and 1400° F., but preferably a temperature of about 1100–1200° F. is utilized. Pressure may vary between 0 and 30 p.s.i.g., with about 11 p.s.i.g. being preferred. Superficial gas velocity in burner 27 should be between 1–3 ft./sec. and the depth of bed 15' is best maintained between 10–20 feet. Additional air to effect combustion is added to the bottom of the burner through line 28. Hot coke and sand-clay particles are withdrawn from bed 15' and returned to reactor 14 through standpipe 29, slide value 48', and riser 29' to supply heat of coking in reactor 14. Steam is introduced into riser 29' via line 29". Flue gases are discharged to the stack 38' after passing through cyclones 30 and 31 arranged in series in burner 27. These flue gases will be subsequently discussed in greater detail.

Cyclones 30 and 31 are used to separate fine particles from gases in which they are entrained and these fine particles may be returned directly to the bed 15' through dipleg 32'. However, this may be undesirable in some cases since fluid coking requires a fairly constant particle size and small particles should be removed from the circulating coke. Therefore, diplegs 32 and 33 of cyclones 30 and 31 preferably discharge outside of the burner vessel 27. The fines from one or both of the diplegs 32 and 33 may be discarded from the system through line 34, or all or part of the fines may be transferred to reactor 14 through line 35.

In the same fashion, dipleg 16' of cyclone 14' may discharge outside of reactor 14.

Within burner 27 about 5–100% of the coke, depending upon feed, Conradson carbon residue, water in the feed and unit operating conditions, is burned. The remaining coke, sand and clay are transferred by means of line 35' to a high temperature second burner 36 which is of the fluid bed variety. There is an advantage of not burning all the coke in the first burner as the coke serves to coat the sand and prevent much of the erosion which high speed sand particles would cause. The second burner 36 may be maintained at a temperature of 1000–1700° F., preferably at about 1400° F.

The solids holdup in reactor 14 may be between about 50 and 1000 tons. The solids holdup in first burner 27 may be between about 15 and 500 tons. The solids holdup in second burner 36 may be between about 2 and 100 tons.

The flue gases from burner 36 in an amount between about $10 \times 10^3$ and $6 \times 10^6$ s.c.f./hr. are removed overhead through line 37 and enter burner 27 above dense bed 15'. The flue gases in line 37 are at a temperature between about 1100 and 1500° F. Here, the combined flue gases from burners 27 and 36 pass through cyclone separators 30 and 31 so that dust and fine coke particles are removed. The flue gases then pass through waste gas turbine 38. The turbine drives air blower 39 and this supplies the air for burners 27 and 36. Air is directed through line 40 and is then directed into the bottom of the burners 27 and 36 through lines 28 and 41, respectively. The waste gas turbine drive air blower may be replaced with a conventional air compressor equivalent.

The combined flue gases from burners 36 and 27 and from turbine 38 at a temperature between about 1000 and 1200° F. are passed through line 12 and enter into the lower region of shed tower 11. About $60 \times 10^3$ to $33 \times 10^6$ s.c.f./hr. of hot gases pass through line 12. Within shed tower 11 the flue gas is passed countercurrently to the bitumen-containing feed. Consequently the hot flue gas serves to preheat the bitumen feed and most important of all remove much of the water from the feed. In fact, as much as 5 to 100% of the water is removed from the feed in this tower 11. It should be noted that the flue gases prior to their entry into shed tower 11 carry a quantity of water as a heat carrier; the source of this water shall be discussed subsequently.

Returning to burner 36, the sand and clay within this burner are burned clean of carbon. The sand itself is heated to a temperature of about 1200–1500° F. It is transferred by means of standpipe 42 to steam-water drum 43. In steam-water drum 43 the hot sand directly contacts the water introduced through line 48 and generates approximately 20–50 p.s.i.g. of steam which is removed overhead through line 43'. The drum 43 is at a temperature between about 212 and 350° F. The steam may be utilized for any one of a great variety of purposes. Distinct possibilities include a source of heat for buildings. One use for the steam would be as a source of process steam for the fluid coker via line 24' or via line 29".

The water removed from the separator 23 through line 44, which may be between 2000 and $100 \times 10^6$ gallons per hour, is injected into high temperature burner 36. This water serves to absorb the heat of combustion from the coke to form steam and to reduce the temperature of the combustion gases in burner 36. The steam is entrained in the flue gas and this provides additional heat carrier in the flue gas for stripping purposes in tower 11.

The hot solids are removed from the bottom of drum 43 as a water slurry through line 45 and are pumped through indirect heat exchanger 46 used to preheat water passing through line 48 into drum 43 to form the steam in steam drum 43. The cooled solids slurry is discarded from the process through line 49.

In a specific embodiment of this invention, the following conditions were utilized.

Table I

Coker 14:
- Coking temperature, °F. _____ 950
- Pressure coker, p.s.i.g. _____ 6
- Feed rate of bitumen, w./w./hr. _____ 0.5
- Solids holdup, tons _____ 1000
- Bed depth, feet _____ 60
- Superficial fluidization gas velocity, f./s. _____ 3

Burner 27:
- Amount of gas passing through line 12, s.c.f./hr. _____ $26 \times 10^6$
- Burner temperature, °F. _____ 1125
- Pressure, p.s.i.g. _____ 8
- Solids holdup, tons _____ 500
- Coke circulation rate, lbs./lb. feed _____ 20
- Superficial fluidization gas velocity, f./s. _____ 3
- Bed depth burner, feet _____ 10

Burner 36:
- Amount of gas passing through line 37, s.c.f./hr. _____ $5 \times 10^6$
- Temperature, °F. _____ 1500
- Solids holdup, tons _____ 100
- Pressure, p.s.i.g. _____ 8

Separator 23: Water, gallons per hour _____ $60 \times 10^3$
Steam drum 43: Temperature, °F. _____ 200

Table II indicates the composition of the bitumen-containing crude extract feed which is to be used in the specific embodiment.

Table II

| | Percent |
|---|---|
| $H_2O$ | 45 |
| Solids | 10 |
| Bitumen | 45 |

Solid material was of the following size:
- Less than 100 mesh _____ 15
- 100–200 mesh _____ 15
- 200–325 mesh _____ 9
- Through 325 _____ 61

About 10,000 b./d. of Athabaska bitumen-containing crude extract are preheated to a temperature of about 200° F. and are then introduced into tower 11 through line 10'. Flue gases at a temperature of about 1150° F. are introduced into the lower region of tower 11 through line 12. The tower 11 is maintained at a temperature of about 200–250° F.

The crude extract and gases are contacted countercurrently in tower 11 and about 60% of the water in the crude extract is thereby removed or stripped from the crude extract. The crude extract from which 60% of the water has been removed is then removed from the bottom region of tower 11 and passed through line 13. It is propelled by means of pump 13' and then introduced into reactor 14. Reactor 14 is maintained at a temperature of 950° F. and a pressure of 6 p.s.i.g.

Within the reactor vaporous products pass through cyclone 14'. The vapors contain entrained solids which are separated in the cyclone system and passed through dipleg 16' to be returned to bed 16. The vapors pass up through scrubber 17 and subsequently to fractionator 20. About 57.1 vol. percent of bitumen feed is drawn off through line 21 as 430° F./1015° F. gas oil. Products boiling below about 430° F. pass through line 22 and into separator 23. About 13.6 vol. percent naphtha on bitumen feed of hydrocarbon are withdrawn through line 23". About 8.2 wt. percent on bitumen feed of gaseous $C_8$ and below hydrocarbon are withdrawn through line 23'. About 33,000 gal./hr. of water are withdrawn through line 44 and passed into secondary burner 36.

Burner 27 is maintained at a temperature of 1125° F. and a pressure of 8 p.s.i.g. Gaseous material, with entrained solid particles, pass through cylones 30 and 31. Solid material is removed through diplegs 32 and 33 which discharge outside of burner 27. In this fashion about 3000 tons per day of solid material is recovered. All or part of this material is rejected. The portion which which may be retained is returned to reactor 14 through line 35. In this manner about 1500 tons per day of material are removed through line 34' and about 1500 tons of material are removed through line 35 and passed to reactor 14.

Approximately 90% of the coke is burned in burner 27; the remaining coke and solid particles pass into burner 36 through line 35. Here the remaining coke is completely burned at a temperature of 1500° F. Water in the amount of about 400 pounds per hour from separator 23 is injected into burner 36 through line 44. This water in the form of steam becomes entrained in the flue gas which leaves burner 36 through line 37 and enters burner 27. Here the flue gases from the two burners are combined. The gases pass through cyclones 31 and 30, through turbine 38 and then out through the stack 38' into line 12. The gases pass through line 12 and are introduced into tower 11 where they are utilized for stripping additional feed.

The remaining solids, which have been heated to a temperature of about 1500° F. are removed through a standpipe 42 and are passed into steam-water drum 43. The contacting of the hot solids and the water produce about 30 p.s.i.g. of steam. Solid products in the form of a water slurry are withdrawn through line 45. Steam is drawn off through line 43'. The slurry amounts to about 660 tons per day and represents about 30% of the total solids which were found in the original feed.

While the invention has been described in detail with respect to a preferred embodiment, it will be understood by those skilled in the art that various changes and modifications may be made without departing from the spirit and scope of the invention and it is intended to cover all such changes and modifications in the appended claims.

What is claimed is:

1. A process for obtaining oil from an admixture of water and mineral solids which comprises countercurrently contacting said mixture in a vessel with hot flue gas thereby removing the greater portion of the said water, passing the resulting mixture into a coking zone wherein it is contacted with a dense fluidized bed of solid particles maintained at a temperature between 800–1200° F., wherein the oil is converted to product vapors and coke is deposited on the said solid particles and a cohesive force is formed between the said deposited coke and the said solids, removing product vapors from the said coking zone, removing a portion of the coke-containing solid particles to a first burning zone, said zone being maintained at a temperature of 800–1400° F., thereby increasing the temperature of the said particles and burning some of said coke, returning a portion of the said heated particles to the said coking zone, passing a second portion of the said coke-containing solid particles from said first burning zone to a second burner maintained at a temperature of 1000–1500° F. to burn all of the said coke, passing the hot flue gases from the said second burner into the said first burner thereby combining the flue gases, subjecting the said combined flue gases to centrifugal force so that any entrained solids are removed, and utilizing said hot flue gases from which entrained solids have been removed as the hot flue gas passed into the bottom of the said vessel for countercurrently contacting the said mixture of oil, water and mineral solids.

2. A process for obtaining oil from an admixture with water and mineral solids which comprises countercurrently contacting said mixture in a vessel with hot flue gas thereby removing the greater portion of the said water, passing the resulting mixture into a coking zone wherein it is contacted with a dense fluidized bed of solid particles maintained at a temperature between 800–

1200° F., wherein the oil is converted to product vapors and coke is deposited on the said solid particles and a cohesive force is formed between the said deposited coke and the said solids, removing product vapors from the said coking zone, removing a portion of the coke-containing solid particles to a first burning zone, said zone being maintained at a temperature of 800–1400° F., thereby increasing the temperature of the said particles and burning some of the said coke, returning a portion of the said heated particles to the said coking zone, passing a second portion of the said coke-containing solid particles from said first burning zone to a second burner maintained at a temperature of 1000–1500° F. to burn all of the said coke, passing the flue gases from the said second burner into the said first burner thereby combining the flue gases, subjecting the said combined flue gases to centrifugal force so as to remove entrained solids, and utilizing said fluid gases from which entrained solids have been removed as the hot flue gas at a temperature of about 1000° F. to 1200° F. passed into the bottom of the said vessel for countercurrently contacting the said mixture of oil, water and mineral solids, passing the heated solids from the said second burner into a steam-water drum, introducing water into said drum for direct contact with said heated solids thereby producing steam, recovering the said steam, removing the said solids as a slurry and disposing of them.

3. The process of claim 1 wherein water is introduced into said second burner to absorb the heat of combustion to provide additional heat carrier in the flue gas passing to said vessel.

4. In the process for recovering oil from an extract from tar sands containing bitumen, water and mineral solids, the steps which comprise introducing the said extract into the top region of a tower, introducing hot flue gases into the bottom region of said tower, countercurrently contacting the said flue gases and the said extract thereby creating a resulting mixture in which most of the said water has been removed, removing the said resulting mixture from the bottom of the said tower and passing the said resulting mixture to a coking zone wherein it is contacted with a fluidized dense turbulent bed of hot solid particles wherein the said oil is converted to product vapors and coke which is deposited on the solid particles, removing product vapors from the said coking zone, removing a portion of the coke-containing particles to a first burning zone to increase the temperature of the said particles and thereby burning some of the said coke, returning a portion of the said heated particles to said coking zone, subjecting the gases within said first burning zone to centrifugal force thereby removing entrained solid particles, passing the said removed solid particles to a zone outside the said first burning zone, passing some of the said last-mentioned particles to the said coking zone, passing a portion of the said solid particles from said first burning zone to a second burning zone thereby burning all of the said coke, directing the flue gases from the said second burning zone into the said first burning zone thereby combining the said flue gases, and subjecting the said combined flue gases to centrifugal force thereby removing any entrained solids, then passing the said hot flue gases into the bottom of the said tower and thereby countercurrently contacting the said extract feed mixture of oil, water and solids.

5. In the process for recovering oil from an extract from tar sands containing bitumen, water and mineral solids, the steps which comprise introducing the said extract into the top region of a tower, introducing hot flue gases into the bottom region of said tower, countercurrently contacting the said flue gases and the said extract thereby creating a resulting mixture in which most of the said water has been removed, removing the said resulting mixture from the bottom of the said tower and passing the said resulting mixture to a coking zone wherein it is contacted with a fluidized dense turbulent bed of hot solid particles wherein the said oil is converted to product vapors and coke which is deposited on the solid particles, removing product vapors from the said coking zone, removing a portion of the coke-containing particles to a first burning zone to increase the temperature of the said particles and thereby burning some of the said coke, returning a portion of the said heated particles to said coking zone, subjecting the gases within said first burning zone to centrifugal force thereby removing entrained solid particles, passing the said removed solid particles to a zone outside the said first burning zone, passing some of the said last-mentioned particles to the said coking zone, passing a portion of the said solid particles from said first burning zone to a second burning zone thereby burning all of the said coke, directing the flue gases from the said second burning zone into the said first burning zone thereby combining the said flue gases, and subjecting the said combined flue gases to centrifugal force thereby removing any entrained solids, then passing the said hot flue gases at a temperature of about 1000° F. to 1200° F. into the bottom of the said tower and thereby countercurrently contacting the said extract feed mixture of oil, water and solids, passing the hot solids from the said second burning zone into a steam-water drum containing water thereby producing steam, recovering the said steam, removing the solids as a slurry and disposing of them.

6. The process of claim 4 where the said coking zone is maintained at a temperature of 800–1200° F. and a pressure of 5–15 p.s.i.g.

7. The process of claim 6 where the said first burning zone is maintained at a temperature between 800–1400° F. and the said second burning zone at a temperature of 1000–1500° F.

8. The process of claim 4 where the said combined flue gases are passed through a waste gas turbine driving an air blower which supplies air for the said two burning zones to provide flue gas which is introduced into the said tower.

9. The process of claim 4 wherein water is separated from the said product vapors and passed into the said second burning zone thereby absorbing heat of combustion from the burning of said coke and providing a carrier for heat in the said flue gas to be passed to said tower.

References Cited by the Examiner

UNITED STATES PATENTS

| 2,670,322 | 2/1954 | Krebs et al. | 208—50 |
| 2,684,933 | 7/1954 | Findlay | 208—356 |

FOREIGN PATENTS

| 530,920 | 9/1956 | Canada. |
| 733,892 | 7/1955 | Great Britain. |

DELBERT E. GANTZ, *Primary Examiner.*

ALPHONSO D. SULLIVAN, *Examiner.*

P. P. GARVIN, H. LEVINE, *Assistant Examiners.*